United States Patent
Kemmler et al.

[11] Patent Number: 6,067,969
[45] Date of Patent: *May 30, 2000

[54] FUEL SUPPLY SYSTEM FOR AN INTERNAL COMBUSTION ENGINE

[75] Inventors: Roland Kemmler, Stuttgart; Eberhard Holder, Kusterdingen, both of Germany

[73] Assignee: DaimlerChrysler AG, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/129,672

[22] Filed: Aug. 5, 1998

[30] Foreign Application Priority Data

Aug. 8, 1997 [DE] Germany ............... 197 34 493

[51] Int. Cl.$^7$ ....................................... F02G 5/00
[52] U.S. Cl. .................... 123/548; 123/549; 123/557; 123/514
[58] Field of Search ..................... 123/516, 518, 123/525, 522, 523, 541, 543, 549, 514, 576–8, 544, 548, 557

[56] References Cited

U.S. PATENT DOCUMENTS

| | | |
|---|---|---|
| 3,788,283 | 1/1974 | Perry . |
| 3,799,125 | 3/1974 | Hutchinson . |
| 4,220,120 | 9/1980 | Jackson et al. . |
| 4,510,914 | 4/1985 | Purser ..................................... 123/548 |
| 4,637,365 | 1/1987 | Yunick ..................................... 123/545 |
| 4,836,173 | 6/1989 | Stires, Jr. ................................ 123/522 |
| 5,373,825 | 12/1994 | Stephens et al. ....................... 123/549 |
| 5,711,282 | 1/1998 | Lang et al. .............................. 123/549 |
| 5,775,308 | 7/1998 | Headley ................................. 123/549 |
| 5,836,290 | 11/1998 | Gilbert ................................... 123/522 |
| 5,850,821 | 12/1998 | Curtis ..................................... 123/522 |

FOREIGN PATENT DOCUMENTS

| | | |
|---|---|---|
| 2 142 414 | 1/1973 | France . |
| 42 15 949 | 4/1993 | Germany . |
| 1 524 467 | 9/1978 | United Kingdom . |
| 2 209 796 | 5/1989 | United Kingdom . |
| 91/04405 | 4/1991 | WIPO . |
| 92/05360 | 4/1992 | WIPO . |

Primary Examiner—Thomas N. Moulis
Attorney, Agent, or Firm—Kenyon & Kenyon

[57] ABSTRACT

A fuel supply system for an internal combustion engine is provided with a fuel tank for liquid fuel, from which a fuel supply line leads to a fuel injection device, and an evaporating and condensing device for low-boiling fuel components, connected to the fuel tank. Also provided is an intermediary tank connected downstream from the evaporating and condensing device, for condensate, from which tank a condensate line leads to a control valve that regulates supply to the injection device. A residual fuel line for the high-boiling fuel produced in the evaporating and condensing device ends in an additional tank, from which a residual fuel supply line runs to a reversing valve mounted in the fuel supply line. The reversing valve is controlled so that the high-boiling fuel is supplied from the residual fuel supply line into the fuel supply line going to an injection device of the engine.

7 Claims, 2 Drawing Sheets

Fig. 1

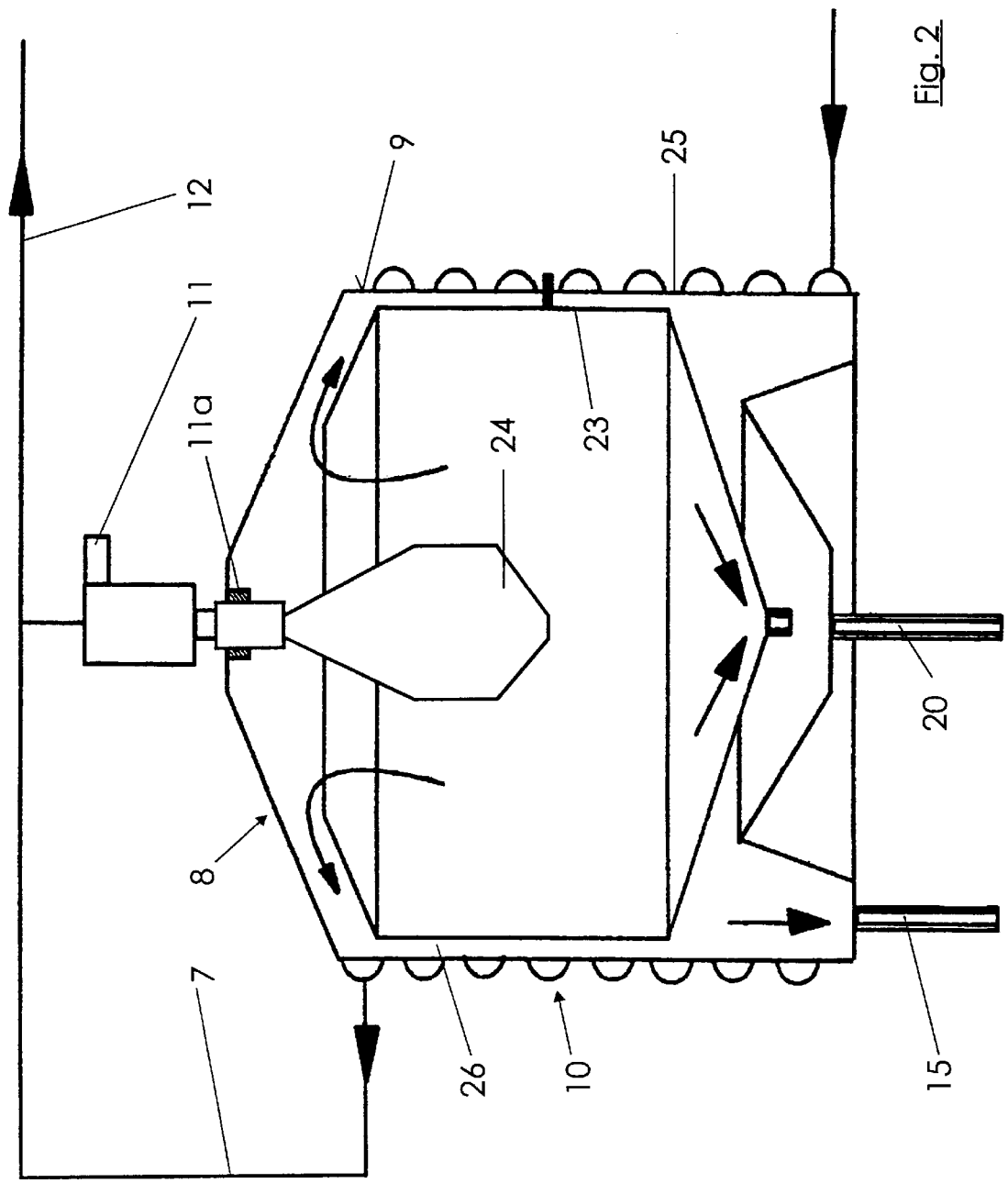

FUEL SUPPLY SYSTEM FOR AN INTERNAL COMBUSTION ENGINE

FIELD OF THE INVENTION

The present invention relates to a fuel supply system for an internal combustion engine, and, in particular, to a fuel supply system having an evaporating and condensing device.

RELATED TECHNOLOGY

A fuel supply system is disclosed in German Patent No. 42 15 949 C1. This fuel supply system diverts some fuel from the fuel supply line and obtains, in an evaporating and condensing device, low-boiling fuel components that can be supplied to the engine during cold starting in order to ensure reliable starting, while reducing crude emissions by the engine during the warm-up period and diminishing the overall pollutant emissions. The higher-boiling fuel portion obtained in the evaporating and condensing device is recirculated to the fuel tank through a residual fuel line.

SUMMARY OF THE INVENTION

An object of the present invention is to improve on the above-described fuel supply system, in particular to achieve even better performance and fuel-economy advantages.

The present invention therefore provides a fuel supply system for an internal combustion engine with a fuel tank for liquid fuel, from which a fuel line runs to an injection device, and an evaporating and condensing device for low-boiling fuel components, connected to the fuel tank. Also provided are an intermediate tank for the condensate downstream from the evaporating and condensing device, from which tank a condensate line runs to a control valve regulating the supply to the injection device, and a residual fuel recirculation line to remove the high-boiling residual fuel produced in the evaporating and condensing device. The residual fuel recirculation line (20) ends in an additional tank (21), from which a residual fuel supply line (22) runs to a reversing valve (6) mounted in the fuel supply line (2). The reversing valve is controlled so that residual fuel is supplied at least partially from the residual fuel supply line (22) into the fuel line (2) leading to the injection device (4) at full load of the engine.

According to the present invention, the residual fuel is no longer recirculated into the fuel tank, but into a separate additional tank, from which the residual fuel is selectively mixed into the fuel line leading to the injection system or is supplied exclusively to the fuel injection system.

At first glance, the fuel system of the present invention may appear to entail increased costs. However, surprising and distinct performance and fuel-economy advantages result from the present invention, since the residual fuel has a higher octane number than the original fuel in the fuel tank. If, according to the present invention, the residual fuel separated and stored in the additional tank is supplied to the engine when it operates at a higher load, in particular at full load, the knock limitation can be avoided using a known knock control method, and the optimum ignition angle can be set. At full load or at higher loads, this results in clear performance and fuel-economy advantages, while the maximum exhaust gas temperature is reduced.

An additional advantage of the present invention is that the time needed to provide the required starting fuel amount from low-boiling fuel components can remain unchanged. If the residual fuel is not supplied to the general fuel tank as it is in prior devices, the fuel stored there is not enriched with higher-boiling fuel components during operation. In particular, in prior devices, in the event of frequent cold starts, the proportion of lower-boiling fuel components is thus reduced, so that these components are increasingly difficult to obtain in the evaporating and condensing device.

In an advantageous refinement of the present invention, the evaporating and condensing device is provided with a heat exchanger device, which transfers the condensation heat given off during the condensation of the low-boiling component to the fuel supplied to the evaporating and condensing device. The heat given off during the condensation of the low-boiling fuel component is advantageously used. In particular, because the fuel is supplied to the evaporating device at a higher temperature, better and quicker evaporation of the fuel is achieved.

BRIEF DESCRIPTION OF THE DRAWINGS

Embodiment of the present invention are elucidated below with reference to the drawings, in which:

FIG. 2 shows a schematic of the evaporating and condensing device according to the present invention.

DETAILED DESCRIPTION

Figure 1:
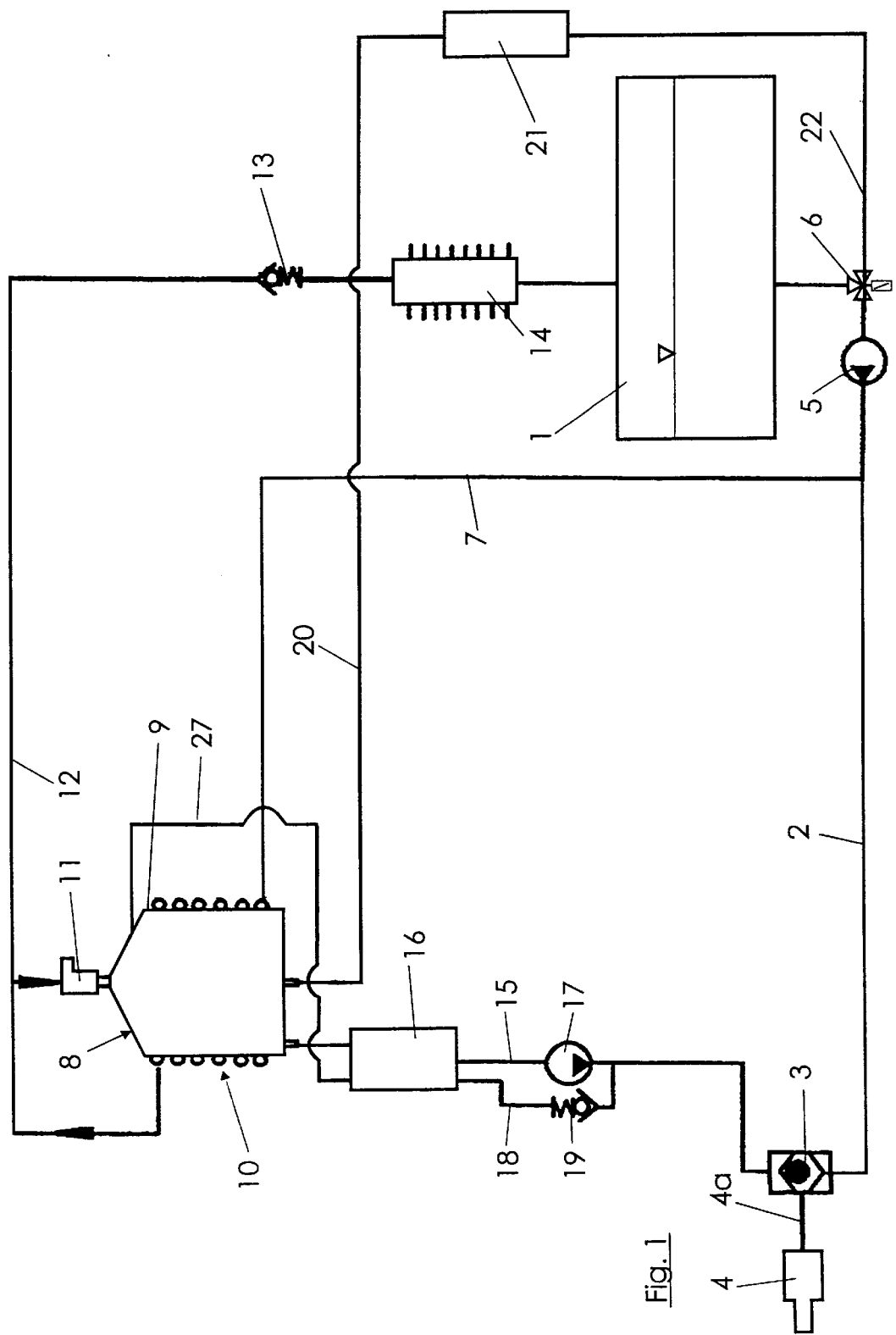
FIG. 1 shows a schematic of a fuel supply system according to the present invention.

Referring to FIG. 1, fuel line 2 goes from fuel tank 1 via shuttle valve 3 acting as a control valve to injection line 4a with injection valve 4, which injects the fuel into a combustion chamber of an internal combustion engine. Downstream from fuel pump 5 and reversing valve 6, mounted on the intake side of this pump, secondary line 7 branches off from fuel line 2. Secondary line 7 is wound in the form of a spiral around evaporating and condensing device 8. The spiral-shaped tubing forms, together with cylindrical outer wall 9 of evaporating and condensing device 8, a heat exchanger device 10. Secondary line 7 leads to evaporating and condensing device 8 via injection valve 11, which may be designed as a conventional electromagnetic injection valve. The fuel supplied is evaporated in injection valve 11 using evaporating element 11a (FIG. 2), which is, e.g., a PTC evaporator. Injection valve 11 may be designed as a combined unit with evaporating element 11a.

The excess fuel from secondary line 7 is recirculated via recirculating line 12, in which pressure-limiting valve 13 is mounted, and via fuel cooler 14 to fuel tank 1.

In evaporating and condensing device 8, the fuel components are separated into a low-boiling point and a high-boiling point fraction. The low-boiling fuel components go, via condensate line 15, intermediate tank 16 for condensate and fuel pump 17, to shuttle valve 3. Pressure-limiting valve 19 is disposed in bypass line 18 around fuel pump 17. The high-boiling component obtained in evaporating and condensing device 8 are recirculated to additional tank 21 via residual fuel recirculation line 20. A residual fuel line 22 goes from additional tank 21 to reversing valve 6.

FIG. 2 shows the construction and operation of evaporating and condensing device 8. Evaporating and condensing device 8 has internal cylindrical housing 23 acting as a collector, where the fuel evaporated with evaporating unit 11a is blown in by injection valve 11 as vapor/drop mist 24. Internal housing 23 has a low heat capacity and is connected to cylindrical outer housing 25 with several—for example, three—screws over its periphery. The higher-boiling fuel components precipitate in internal housing 23 and are removed downward via residual fuel recirculation line 20.

The low-boiling fuel components exit as vapor through the top opening of the collector, i.e., internal housing 23, as indicated by the arrows in FIG. 2, and condense on the inner wall of external housing 25. The transition from internal housing 23 to external housing 25 is preferably designed so that any droplets with higher-boiling fuel components entrained in the vapor mist are retained in internal housing 23.

Heat exchanger 10, which removes the heat produced during condensation into secondary line 7, is on outer wall 9 of external housing 25. An outlet opening for the condensate line 15 is provided on the bottom of the external housing 25, in the area of a gap 26. The outlet opening results from the difference in diameters between internal housing 23 and external housing 25. Condensate runs in gap 26 along the inner wall of external housing 25 downward in the direction of the arrow shown on FIG. 2 and is removed into condensate line 15.

The operation of a fuel supply system according to the present invention may be described as follows:

Fuel is supplied from fuel line 2 via conventional fuel pump 5 with a pressure, for example, of 3.8 bar over atmospheric pressure. The fuel diverted from fuel line 2 on the suction side of fuel pump 5 into secondary line 7 first flows through heat exchanger 10 on outer wall 9 of evaporating and condensing device 8 to receive condensation heat. Then the fuel preheated in this manner goes to injection valve 11 having electrically heated evaporating unit 11a. Any excess fuel is removed in recirculation line 12 via pressure-limiting valve 13 and fuel cooler 14, and transferred into fuel tank 1.

The condensate made up of low-boiling fuel components is pre-stored in intermediate tank 16. Intermediate tank 16 is also connected to evaporating and condensing device 8 via an equalizing line 27. The condensate is transported in condensate line 15 via additional fuel pump 17. Shuttle valve 3, whose inlet is connected to fuel supply line 2 and condensate line 15 and whose outlet is connected to injection valve 4 via injection line 4a, opens a fuel path upstream of each injection valve 4 of the internal combustion engine. The fuel path opened is that fuel path having an active fuel pump at the time. A shuttle valve 3, supplied from condensate line 15 or fuel supply line 2, is associated with each injection valve 4 of an engine.

Using shuttle valve 3 and reversing valve 6, it can be ensured that the engine is supplied with the best possible fuel components for optimum operation by selectively feeding it with fuel, i.e., original fuel, low-boiling fuel from condensate line 15, or high-octane residual fuel from residual fuel line 22.

Prior to being shut off, the engine may be supplied, for a short period of time, from condensate line 15, with shuttle valve 3 being switched as appropriate. In this way, at a subsequent start condensate from condensate line 15 can again be injected into the respective injection valve 4 from the very first injection. The dieseling time after the engine has been turned off may be substantially reduced with bottom-scavenged injection valves 4.

After restart, when a predefined parameter, e.g., the cooling water temperature, has exceeded a characteristic value, shuttle switch 3, is switched over to the original fuel from fuel line 2.

In the full engine load range, reversing valve 6 is switched over so that residual fuel is supplied from additional tank 21 into fuel line 2. In this way the engine is supplied with anti-knock fuel due to the higher octane number of the residual fuel.

What is claimed is:

1. A fuel supply system for an internal combustion engine comprising:

a fuel tank for holding liquid fuel;

an injection device connected to the fuel tank by a fuel supply line;

an evaporating and condensing device connected to the fuel tank, the evaporating and condensing device for separating at least some of the liquid fuel into low-boiling fuel components by condensing into a condensate and into high-boiling residual fuel components;

an intermediate tank for receiving the condensate from the evaporating and condensing device;

a control valve for regulating a fuel supply to the injection device, the control valve being connected to the intermediate tank by a condensate line;

an additional tank connected to a residual fuel recirculation line ending in the additional tank, the residual fuel recirculation line for removing the high-boiling residual fuel components from the evaporating and condensing device;

a reversing valve disposed in the fuel supply line and connected to the additional tank by a residual fuel supply line, the reversing valve being controlled so that at least some of the residual fuel components are supplied from the residual fuel supply line into the fuel supply line at full load of the internal combustion engine.

2. The fuel supply system as recited in claim 1 wherein the evaporating and condensing device includes a heat exchanger device for delivering heat produced during the condensing.

3. The fuel supply system as recited in claim 2 wherein the evaporating and condensing device further includes an internal housing acting as a collector and an external housing having an outer wall, the high-boiling residual fuel components precipitating at the internal housing, the low-boiling fuel components precipitating at the external housing, and the heat exchanger device being disposed on the outer wall.

4. The fuel supply system as recited in claim 3 wherein the internal housing and the external housing are approximately cylindrically shaped and form an annular gap therebetween, the condensing of the low-boiling fuel components occurring in the annular gap, and wherein the heat exchanger device includes a secondary fuel line wound around the external housing in a spiral form.

5. The fuel supply system as recited in claim 1 wherein the evaporating and condensing device further includes an injection valve for evaporating the at least some of the liquid fuel.

6. The fuel supply system as recited in claim 1 wherein the control valve is a shuttle valve including an inlet side and an outlet side, the fuel supply line and the condensate line being connected to an ending at the shuttle valve inlet side, and the shuttle valve outlet side being connected to the injection device via an injection line.

7. The fuel supply system as recited in claim 6 further comprising a fuel pump disposed in the condensate line between the intermediate tank and the shuttle valve.

* * * * *